United States Patent [19]

Fikentscher et al.

[11] Patent Number: 5,234,626

[45] Date of Patent: Aug. 10, 1993

[54] METHODS OF DEMULSIFYING EMPLOYING CONDENSATES AS DEMULSIFIERS FOR OIL-IN WATER EMULSIONS

[75] Inventors: Rolf Fikentscher; Knut Oppenlaender, both of Ludwigshafen; Johannes P. Dix, Weisenheim; Wilfried Sager, Mutterstadt; Hans-Henning Vogel, Frankenthal; Guenther Elfers, Birkenau, all of Fed. Rep. of Germany

[73] Assignee: BASF Aktiengesellschaft, Ludwigshafen, Fed. Rep. of Germany

[21] Appl. No.: 827,170

[22] Filed: Feb. 11, 1991

[30] Foreign Application Priority Data

Feb. 28, 1990 [DE] Fed. Rep. of Germany ....... 4006255

[51] Int. Cl.$^5$ ...................... B01D 17/05; B01D 17/04
[52] U.S. Cl. .................... 252/341; 252/344; 252/358; 210/708; 208/188
[58] Field of Search .......... 252/344, 358, 341; 210/708; 208/188

[56] References Cited

U.S. PATENT DOCUMENTS

| | | | |
|---|---|---|---|
| 2,407,895 | 9/1946 | Monson et al. | 252/344 |
| 3,528,928 | 9/1970 | Rushton | 252/341 |
| 3,751,370 | 8/1973 | Stimberg et al. | 252/358 X |
| 4,179,396 | 12/1979 | Gabel et al. | 252/344 X |
| 4,303,780 | 12/1981 | Bellos | 528/367 OR |
| 4,333,947 | 6/1982 | Karjalainen et al. | 514/399 |
| 4,383,933 | 5/1983 | Jenkins | 252/344 X |
| 4,384,951 | 5/1983 | McCoy et al. | 252/358 X |
| 4,404,362 | 9/1983 | Bellos | 252/344 X |
| 4,459,220 | 7/1984 | Bellos | 252/344 |
| 4,500,735 | 2/1985 | Diery et al. | 252/358 X |
| 4,505,839 | 3/1985 | Bellos et al. | 252/344 |
| 4,506,081 | 3/1985 | Fenyes et al. | 252/319 X |
| 4,731,481 | 3/1988 | Bellos et al. | 252/344 X |
| 4,778,813 | 10/1988 | Fenyes et al. | 514/357 |
| 4,840,748 | 6/1989 | Bellos et al. | 252/344 |
| 4,931,065 | 6/1990 | Baumgarte et al. | 8/188 |
| 5,015,754 | 5/1991 | Dix et al. | 558/260 |

FOREIGN PATENT DOCUMENTS 3829974 3/1990 Fed. Rep. of Germany .
1318564 5/1973 United Kingdom .

OTHER PUBLICATIONS

Derwent Abstract, 83-754398/36 (corresponding to EP 0 087 147 and U.S. Pat. No. 4,500,735).
Derwent Abstract, 85-203991/34 (corresponding to DE 3404538).

*Primary Examiner*—Robert L. Stoll
*Assistant Examiner*—Daniel S. Metzmaier
*Attorney, Agent, or Firm*—Keil & Weinkauf

[57] ABSTRACT

The present invention relates to methods of demulsifying employing condensates as demulsifiers for oil-in-water emulsions and prepared from A) a precondensate from one or more trialkanolamines of the general formula I

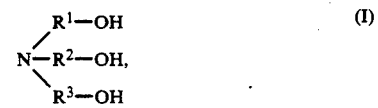

in which $R^1$ to $R^3$ denote the same or different 1,2-alkylene groups of from 2 to 4 carbon atoms, and B) from 0.1 to 30% w/w, based on said precondensate, of one or more of the following compounds II:

a) urea or a urea derivative of the general formula IIa

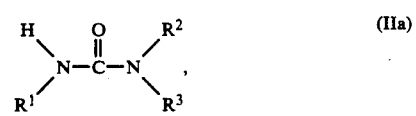

b) a urea derivative of the general formula IIb (Abstract continued on next page.)

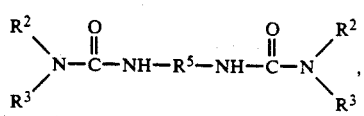
c) a urethane of the general formula IIc
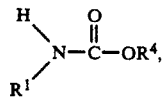
and/or
d) a urethane of the general formula IId
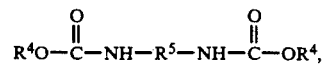
in which
$R^1$ is hydrogen, $C_1$–$C_{20}$-alkyl or $C_2$–$C_{20}$-alkenyl,
$R^2$ and $R^3$ are the same or different and denote hydrogen or $C_1$–$C_4$-alkyl,
$R^4$ is $C_1$–$C_4$-alkyl and
$R^5$ is $C_1$–$C_{12}$-alkylene.
8 Claims, No Drawings

METHODS OF DEMULSIFYING EMPLOYING CONDENSATES AS DEMULSIFIERS FOR OIL-IN WATER EMULSIONS

The present invention relates to condensates which are suitable as demulsifiers for oil-in-water emulsions and which are prepared from A) a precondensate from one or more trialkanolamines of the general formula I

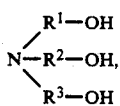

in which $R^1$ to $R^3$ denote the same or different 1,2-alkylene groups of from 2 to 4 carbon atoms, and B) from 0.1 to 30% w/w, based on said precondensate, of one or more of the following compounds II:

a) urea or a urea derivative of the general formula IIa

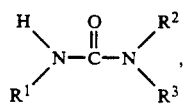

b) a urea derivative of the general formula IIb

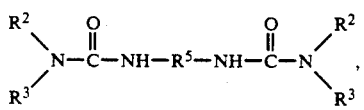

c) a urethane of the general formula IIc

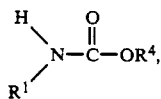

and/or d) a urethane of the general formula IId

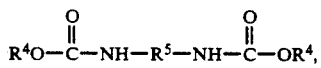

in which
$R^1$ is hydrogen, $C_1$-$C_{20}$-alkyl or $C_2$-$C_{20}$-alkenyl,
$R^2$ and $R^3$ are the same or different and denote hydrogen or $C_1$-$C_4$-alkyl,
$R^4$ is $C_1$-$C_4$-alkyl and
$R^5$ is $C_1$-$C_{12}$-alkylene.

The invention also relates to a process for the preparation of said condensates and to their use as demulsifiers for oil-in-water emulsions.

The production and subsequent processing of crude oils involves large quantities of oil-in-water emulsions in which the continuous phase depends on the ratio of water to oil, on the natural emulsifier system contained in the oil and on the origin of the emulsion. Most of the crude oil to be transported is in the form of a water-in-oil emulsion which must be broken by the addition of chemical demulsifiers. The separated brine contains a certain amount of residual oil and there is a tendency for oil-in-water emulsions to form.

The tendency for oil-in-water emulsions to occur when crude oils are processed on the oil field or in refineries is even stronger. The amount of emulsified crude oil in said oil-in-water emulsions can be up to 5%. To remove this residual oil content, use is made of special demulsifiers, so-called 'deoilers', which are usually cationic polymers, as described, for example, in DE 3,404,538. Typical products are also described in U.S. Pat. Nos. 3,528,928 and 4,333,947.

The removal of the residual oil content is necessary for clarification and processing of oil field waste water and for ecological and engineering reasons, since, for example, when said water is used for secondary production by water drive the presence of residual oil therein would increase the injection pressure.

U.S. Pat. No. 2,407,895 describes a method of breaking oil-in-water emulsions with comparatively low molecular weight condensates of alkanolamines, prepared by condensation in the presence of basic catalysts.

Further, U.S. Pat. Nos. 4,179,396 and 4,383,933 describe deoilers prepared from aluminum salts or titanium tetrachloride and alkanolamine condensates, which may have been partially acylated or quaternized.

In addition, U.S. Pat. Nos. 4,505,839 and 4,731,481 describe the use of quanternized and low molecular weight alkanolamine polycondensates as deoilers, which have been prepared by catalytic reaction with $ZnCl_2$/acetic acid or $Al_2(SO_4)_3$/acetic acid.

Also, U.S. Pat. Nos. 4,404,362 and 4,459,220 describe block polycondensates prepared by the condensation of triethanolamine polycondensates and triisopropanolamine polycondensates separately synthesized by catalytic reaction with Lewis acids or mineral acids.

However, such prior demulsifiers are not satisfactory.

We have now found the condensates defined above, which are superior to the prior art deoilers in respect of general usefulness and emulsion-breaking speed. They contain no metal salts, in particular no chlorides, which could have a corrosive action. Unlike deoilers which have been prepared by condensation in the presence of carboxylic acids, the demulsifiers of the invention contain no carboxylate groups which could impair their efficiency.

The preferred and particularly effective compounds are those condensates in the production of which the precondensate A used is a trialkanolamine polyether prepared by condensation, in the presence of phosphorous acid and/or hypophosphorous acid, of one or more trialkanolamines of the general formula

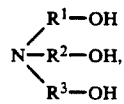

in which $R^1$ to $R^3$ denote the same or different 1,2-alkylene groups of from 2 to 4 carbon atoms.

The trialkanolamine polyethers used as precondensate A in the preparation of the condensates of the invention are advantageously prepared by condensing the trialkanolamines, preferably triethanolamine or triisopropanolamine $N[CH_2-CH(CH_3)-OH]_3$ or mixtures of several trialkanolamines in the presence of acid catalysts at elevated temperature. Preferred acid catalysts are phosphorous acid ($H_3PO_3$) and/or hypophosphorous acid ($H_3PO_2$). The acid catalyst is advantageously used, calculated as 100% acid, in an amount of from 0.05 to 2% w/w and preferably from 0.1 to 1% w/w of the trialkanolamine to be condensed.

Generally, the temperature used for the condensation ranges from 120° to 280° C. and is preferably from 150° to 260° C. and more preferably from 180° to 240° C. The reaction is generally carried out over a period of from 1 to 10 hours and preferably from 4 to 8 hours. Advantageously, the degree of condensation is controlled by varying the temperature and time of reaction in such a manner that when triethanolamine is used as starting material, the viscosity of the resulting triethanolamine polyether is in the range of 10,000 to 100,000 mPa.s, preferably 20,000 to 50,000 mPa.s, and, similarly, the viscosity of the triisopropanolamine polyether is in the range of 100,000 to 1,000,000 mPa.s, preferably 200,000 to 600,000 mPa.s, and that of a mixed condensate from, preferably, equimolar amounts of triethanolamine and triisopropanolamine is in the range of 80,000 to 400,000 mPa.s, preferably 100,000 to 300,000 mPa.s (measured, in all cases, on the undiluted product at 20° C.).

The resulting precondensates A are reacted with one or more compounds IIa to IId to form the condensates of the invention.

Suitable compounds of the general formula IIa

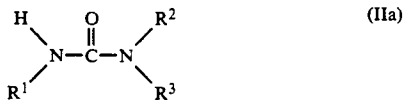

are, if $R^1$ is alkyl, preferably those in which $R^1$ is $C_1$–$C_{10}$-alkyl and in particular $C_1$–$C_4$-alkyl.

Examples thereof are ureas such as urea, N-methyl urea, N-ethyl urea, N-propyl urea, N-butyl urea, N,N'-dimethyl urea, N,N'-diethyl urea, N,N'-dipropyl urea, N,N'-dibutyl urea, N-(2-ethylhexyl) urea, N-isononyl urea, N-isotridecyl urea, N-lauryl urea, N-myristyl urea, N-palmityl urea, N-stearyl urea, N-oleyl urea, N-linolyl urea and N-linolenyl urea. We prefer to use monosubstituted ureas, or more preferably, unsubstituted urea.

Examples of compounds of the general formula IIb are bisureas such as methylene-diurea, ethylene-1,2-diurea, propylene-1,3-diurea, butylene-1,4-diurea and pentamethylene-1,5-diurea, hexamethylene-1,6-diurea. We prefer to use bisureas having an alkylene bridge $R^6$ containing from 1 to 10 carbon atoms.

Examples of compounds of the general formula IIc

are, if $R^1$ is alkyl, preferably those in which $R^1$ is $C_1$–$C_4$-alkyl.

Examples of compounds of the general formula IIc are urethanes such as methyl carbamate, ethyl carbamate, propyl carbamate, butyl carbamate and the N-methyl, N-ethyl, N-propyl and N-butyl derivatives thereof.

Examples of compounds of the general formula IId are bisurethanes such as the dimethyl, diethyl, dipropyl and dibutyl esters of the acids ethylene-1,2-dicarbamic acid, propylene-1,3-dicarbamic acid, butylene-1,4-dicarbamic acid, pentamethylene-1,5-dicarbamic acid and hexamethylene-1,6-dicarbamic acid.

The reaction of a precondensate from triethanolamine with the compounds IIa to IId is generally carried out at a temperature of from 100° to 210° C., preferably from 140° to 200° C., advantageously without the use of a solvent, generally until the viscosity is from 20,000 to 300,000 mPa.s, preferably from 28,000 to 150,000 mPa.s.

The reaction of a precondensate from triisopropanolamine with the compounds IIa to IId is generally carried out at a temperature of from 100° to 210° C., preferably from 140° to 200° C., advantageously without the use of a solvent, generally until the viscosity is more than 500,000 mPa.s.

The reaction of a precondensate from a mixture of triethanolamine and triisopropanolamine, preferably in a molar ratio of 1:1, with the compounds IIa to IId is generally carried out at a temperature of from 100° to 210° C., preferably from 140° to 200° C., advantageously without the use of a solvent, generally until the viscosity is more than 300,000 mPa.s.

The precondensates are preferably reacted with the ureas IIa and the bisureas IIb.

The condensates of the invention are added to oil-in-water emulsions for the purpose of breaking the emulsion, the amount added being advantageously from 1 to 100 ppm, preferably from 1 to 30 ppm and more preferably from 2 to 10 ppm, by weight.

EXAMPLES

In the following synthesis and application Examples, the percentages are by weight unless otherwise stated. The viscosities were measured in a rotary viscosimeter (Haake, Rotavisco) at 20° C.

SYNTHESIS EXAMPLES

Synthesis Example 1

1,788 g of triethanolamine and 12 g of hypophosphorous acid (50% aqueous solution) were heated at 225° to 230° C. with stirring under a weak stream of nitrogen. The water of reaction was distilled off. After 7 to 8 hours, at which point the viscosity was 21,000 mPa.s, condensation was terminated by cooling to room temperature. There were obtained 1,492 g of triethanolamine condensate (amine number 7.69 mmoles/g).

130 g of this triethanolamine polyether were heated to 170° to 180° C. with 3.0 g (5% molar) of urea with stirring under nitrogen and maintained at this temperature for 6 hours until no more ammonia was liberated. The resulting urethane had a viscosity of from 41,000 to 45,000 mPa.s.

Synthesis Example 2

260 g of a triethanolamine precondensate (amine number 7.69 mmoles/g) having a viscosity of 19,900 mPa.s and prepared as described in Synthesis Example 1 were stirred with 10.1 g of hexamethylene-1,6-diurea (equivalent to 2.5% molar) under nitrogen for 2 hours at 160° C. and then for 4 hours at 180° C. until the liberation of ammonia stopped. The viscosity of the resulting condensate was 63,000 mPa.s.

Synthesis Example 3

131.2 g of a triethanolamine precondensate (amine number 7.62 mmoles/g) having a viscosity of 20,400 mPa.s and prepared as described in Synthesis Example 1 were stirred with 36.3 g of isotridecyl urea (equivalent to 15% molar) under nitrogen for 1.5 hours at 165° C. and then for 5 hours at 180° C. until the liberation of ammonia stopped. The viscosity of the resulting condensate was 34,800 mPa.s.

Synthesis Example 4

670.6 g of triethanolamine and 860.7 g of triisopropanolamine (both 4.5 moles) were stirred together with 9.0 g of hypophosphorous acid (50% aqueous solution) under a weak stream of nitrogen at 220° C. The water of reaction was distilled off. After 7 to 8 hours, at which point the viscosity of the product was 174,600 mPa.s, condensation was terminated by cooling to room temperature. There were obtained 1,332 g of co-condensate (amine number 6.46 mmoles/g).

309.6 g of this co-condensate were stirred with 6.0 g of urea (equivalent to 5% molar) under nitrogen and heated to 170° to 180° C. and then maintained at this temperature for 5 hours until no more ammonia was liberated. The resulting condensate had a viscosity of 383,000 mPa.s.

Synthesis Example 5

1,530 g of triisopropanolamine and 8.0 g of hypophosphorous acid (50% aqueous solution) were stirred and heated to 200°-225° C. under a weak stream of nitrogen in a manner similar to that described in Synthesis Examples 1 to 4. The water of reaction was distilled off. When the viscosity of the product reached 390,000 mPa.s, condensation was terminated by cooling to room temperature.

359.6 g of this triisopropanolamine precondensate (amine number 5.56 mmoles/g) were heated with 6.0 g of urea (equivalent to 5% molar) with stirring under nitrogen to a temperature of from 170° to 180° C. and then maintained at this temperature for 5 hours until no more ammonia was liberated. On cooling to room temperature, the condensate solidified.

EXAMPLE OF APPLICATION 1000 mg of a crude oil were dispersed in 1 liter of water in an Ultra-Turrax at 10,000 rpm. Batches of 150 ml of the resulting oil-in-water emulsion were placed in a 250 ml drip funnel, and doses of a 2.5% w/w solution of the demulsifier obtained in Synthesis Example 1 were added thereto. The doses used were 1, 2.5, 5 and 10 ppm, based on the weight of the oil-in-water emulsion. Following the addition of demulsifier, the emulsion of crude oil was in each case vigorously shaken 50 times in the drip funnel and then allowed to stand for 10 minutes. A sample of water was taken from the bottom of the drip funnel and its residual oil content was determined by photometric analysis of the residual oil (infrared absorption) in a CCl$_4$ extract of said sample of water (Horiba apparatus).

The results of the tests are listed in the Table below:

| Demulsifier | Dosage of demulsifier | Residual content of crude oil |
| --- | --- | --- |
| Triethanolamine polyether cross-linked with urea as described in Synthesis Example 1 | 1 ppm w/w | 112 ppm w/w |
| | 2.5 ppm w/w | 65 ppm w/w |
| | 5 ppm w/w | 60 ppm w/w |
| | 10 ppm w/w | 58 ppm w/w |
| | Control: content of crude oil in untreated emulsion | 967 ppm w/w |

The use of demulsifier as proposed in the present invention gives particularly good results at a dosage ranging from 2.5 to 10 ppm, by weight.

We claim:

1. A process for demulsifying an oil-in-water emulsion which comprises: contacting the oil-in-water emulsion with a demulsifying effective amount of a condensate prepared by reacting
   A) a precondensate from one or more trialkanolamines of the formula I

in which R$^1$ to R$^3$ denote the same or different 1,2-alkylene groups of from 2 to 4 carbon atoms, with
   B) from 0.1 to 30% w/w, based on said precondensate, of one or more of the following compounds II:
   a) urea or a urea derivative of the formula IIa

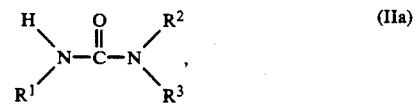

b) a urea derivative of the formula IIb

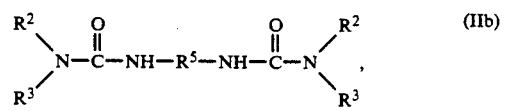

c) a urethane of the formula IIc

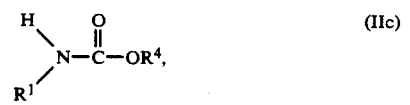

and/or
   d) a urethane of the formula IId

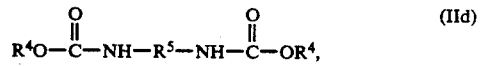

in which
   R$^1$ is hydrogen, C$_1$-C$_{20}$-alkyl or C$_2$-C$_{20}$-alkenyl,
   R$^2$ and R$^3$ are the same or different and denote hydrogen or C$_1$-C$_4$-alkyl,
   R$^4$ is C$_1$-C$_4$-alkyl and
   R$^5$ is C$_1$-C$_{12}$-alkylene.

2. The process of claim 1, wherein the amount of condensate is from 1 to 100 ppm by weight.

3. The process of claim 1, wherein the amount of condensate is from 1 to 30 ppm by weight.

4. The process of claim 1, wherein the amount of condensate is from 2 to 10 ppm by weight.

5. A process for demulsifying an oil-in-water emulsion which comprises: contacting the oil-in-water emulsion with a demulsifying effective amount of a condensate prepared by reacting A) a precondensate obtained by condensation of one or more trialkanolamines of the formula I

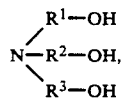  (I)

in which $R^1$ to $R^3$ denote the same or different 1,2-alkylene groups of from 2 to 4 carbon atoms, in the presence of phosphorous acid and/or hypophosphorous acid, with B) from 0.1 to 30% w/w, based on said precondensate, of one or more of the following compounds II:

a) urea or a urea derivative of the formula IIa

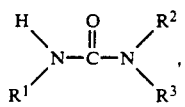  (IIa)

b) a urea derivative of the formula IIb

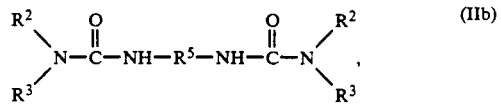  (IIb)

c) a urethane of the formula IIc

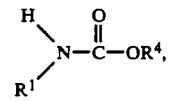  (IIc)

and/or d) a urethane of the formula IId

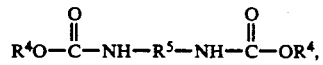  (IId)

in which
$R^1$ is hydrogen, $C_1$-$C_{20}$-alkyl or $C_2$-$C_{20}$-alkenyl,
$R^2$ and $R^3$ are the same or different and denote hydrogen or $C_1$-$C_4$-alkyl,
$R^4$ is $C_1$-$C_4$-alkyl and
$R^5$ is $C_1$-$C_{12}$-alkylene.

6. The process of claim 5, wherein the amount of condensate is from 1 to 100 ppm by weight.

7. The process of claim 5, wherein the amount of condensate is from 1 to 30 ppm by weight.

8. The process of claim 5, wherein the amount of condensate is from 2 to 10 ppm by weight.

* * * * *